United States Patent [19]

McCready et al.

[11] 3,993,804

[45] Nov. 23, 1976

[54] SULFURIC ACID PAINT STRIPPER FOR RUBBER

[75] Inventors: Newton W. McCready, Newtown Square; Robert W. Koch, Norristown, both of Pa.

[73] Assignee: Amchem Products, Inc., Ambler, Pa.

[22] Filed: Apr. 2, 1975

[21] Appl. No.: 564,586

[52] U.S. Cl. .................................. 427/140; 134/38; 252/142; 252/DIG. 8
[51] Int. Cl.² ........................................... C09D 9/00
[58] Field of Search ............... 252/DIG. 8, 142, 143, 252/173, 558; 134/38, 40, 42; 427/140, 331, 352, 353, 354

[56] References Cited
UNITED STATES PATENTS
1,553,485  9/1925  Tennis ........................... 252/DIG. 8

FOREIGN PATENTS OR APPLICATIONS
7,232  9/1905  United Kingdom ............ 252/DIG. 8

Primary Examiner—Thomas J. Herbert, Jr.
Assistant Examiner—Bruce H. Hess
Attorney, Agent, or Firm—Ernest G. Szoke; Howard S. Katzoff; Michael E. Zall

[57] ABSTRACT

A process for removing paint from rubber surfaces employing an acidic stripping solution comprising sulfuric acid and preferably one or more anionic wetting agents.

9 Claims, No Drawings

SULFURIC ACID PAINT STRIPPER FOR RUBBER

BACKGROUND OF THE INVENTION

Removal of a paint coating from rubber surfaces is desirable and necessary on occasion. The necessity and desirability for removal of the coating can be for several reasons, for example runs in the paint, scratches, flaws, improper painting, and a desire for repainting with paint of an alternate color.

Conventional methods for removal of paints, and in particular, polyether, polyester and polyurethane paints from rubber surfaces have been unsatisfactory for a number of reasons. In some cases the time required for the removal of the paint has been excessive. When known solvent based paint removers have been employed, the cleaned rubber surface has frequently been found to be unreceptive to repainting. Solvent based paint removers can require high temperatures for effective stripping action accompanied by the ancillary problem of undesirable fumes and the hazard of fire. When the paint has eventually been removed from a rubber surface, particularly from a synthetic polyolefin rubber, the surface has required additional treatment, for example irradiation with ultraviolet light, or treatment with an activating solvent, to make it receptive to repainting. Some paint strippers, though effective for removing paint, attack the rubber surface, rendering the surface unsatisfactory for use, and also have the disadvantage of producing noxious fumes or are expensive to use.

SUMMARY OF THE INVENTION

A process has now been discovered for removing paint from rubber surfaces by contacting a painted rubber surface with an acidic stripping solution comprising sulfuric acid, and preferably in addition one or more anionic wetting agents and water.

It is an object of this invention to remove paints from a rubber surface, and in particular hard to remove paints such as polyurethane, polyester and polyether paints.

It is another object of the invention to remove paints from a rubber surface without adversely affecting the rubber surface.

It is another object to obtain a surface after removal of the paint, and in particular hard to remove paints, such as polyurethane, polyester and polyether paints; which surface is receptive to repainting.

It is another object to prepare an originally painted rubber surface, particularly a synthetic polyolefin rubber surface, for repainting by removing the paint with an acidic stripping solution, which surface requires no additional processing thereafter.

These and other objects which will be apparent from the following description are accomplished by a process employing an acidic stripping solution comprising sulfuric acid, and preferably an acidic stripping solution consisting essentially of sulfuric acid, at least one anionic wetting agent and water.

DETAILED DESCRIPTION OF THE INVENTION

It has been found that an acidic stripping solution comprising sulfuric acid is useful for removing paints from a rubber surface, and particularly paints which have heretofore been difficult to remove, for example polyurethane, polyester and polyether paints. It is preferred to employ a stripping solution consisting essentially of sulfuric acid, an anionic wetting agent and water, which unexpectedly leaves the rubber surface in a condition receptive to repainting without additional preparatory treatment, other than water rinsing and drying. The rubber surface subsequent to stripping with the stripping solution, shows excellent paint bonding qualities when repainted.

The terms "stripping solution" and "acidic stripping solution" when employed herein, mean the acidic solution comprising sulfuric acid, which solution is suitable for removing paint from a rubber surface.

The term "rubber" herein means a natural or synthetic elastic hydrocarbon polymer.

The terms "paint" and "paint coating" when employed herein mean an organic, curing covering which forms a hardened, flexible, scuff-resistant finish which is suitable for coating a resilient rubber surface. Exemplary of such paints are latex, polyacrylic, polyurethane, polyester and polyether paints.

It has been discovered that sulfuric acid is particularly effective for removing paint from a rubber surface. Paints which have previously been known to be difficult to strip can be completely removed. For example polyurethane, polyether and polyester paints can be removed from a rubber surface without adversely affecting the surface. Likewise latex and polyacrylic paints, which have been removed by other known paint removers can be easily and quickly removed in the process of the present invention.

Acids in addition to sulfuric acid, for example hydrochloric, hydrofluoric and phosphoric acids, can be present in the stripping solution. While other acids can be present in a greater amount, it is preferred that the amount thereof not exceed about 20 weight percent. Accordingly, up to about 20 weight percent of other acids can be present in the stripping solution without adversely affecting the paint stripping ability.

It is only necessary that the sulfuric acid be present in the stripping solution in an amount of from about 55 weight percent to about 99.95 weight percent, and preferably in an amount from about 70 weight percent to about 95 weight percent. The balance can comprise water, other acids, acid stable anionic wetting agents and the like. Sulfuric acid is, by nature highly deliquescent. Accordingly sulfuric acid can not practically be obtained or maintained at 100% concentration, nor is it necessary. Accordingly the term "sulfuric acid" implicitly includes some water except wherein the concentration is explicitly stated. For example, commercial concentrated sulfuric acid contains from about 2 to about 5 weight percent of water.

It has been found that anionic wetting agents improve the paint stripping action of sulfuric acid. The anionic wetting agents should be stable, of course, in the presence of sulfuric acid, and should be soluble in the acidic solution. The manifestation of an unstable anionic wetting agent is that it will precipitate, gel, decompose, fractionate, or otherwise be rendered ineffective. Particularly good results have been obtained by utilizing one or more anionic wetting agents selected from the group consisting of an alkoxy acid, sulfonate salts and phosphate esters of aryl and lower aralkyl compounds, and their acid soluble metal and ammonium salts. Examples of commercially available anionic wetting agents which can be used include the following: Alkawet-B, a sodium salt of an alkoxy acid; Ultrawet-40SX, a sodium xylene sulfonate; and Klearfac-AA040, an organic phosphate ester.

Preferably the anionic wetting agent is selected from the group consisting of an alkoxy acid, phosphate esters of aryl and lower aralkyl compounds, and their sodium salts. Stripping solutions within the preferred scope of the invention comprising sulfuric acid, together with an anionic wetting agent selected from the group consisting of an alkoxy acid, phosphate esters of aryl and lower aralkyl compounds, and their sodium salts and water in an amount not to exceed about 30 weight percent, have been found to exhibit superior performance when employed in the process of the invention. Such preferred solutions have been found to remain stable for more than a year in storage.

When employed herein, the term "anionic wetting agent" means one or more anionic wetting agents, preferably of the group described above. When one anionic wetting agent is mentioned, substitution with one or more of the anionic wetting agents herein described should be understood.

The anionic wetting agent, when employed can be present in the stripping solution in an amount up to the limit of solubility. While we have found even the smallest amount of the anionic wetting agent improves the paint stripping ability of the stripping solution, when at least 0.025 weight percent, and preferably at least 2.0 weight percent is present, particularly improved results are obtained. For example a rubber surface stripped of paint by contacting the painted surface with a preferred stripping solution comprising sulfuric acid, an anionic wetting agent and water is more receptive of paint and has paint adherent qualities superior to a rubber surface treated with sulfuric acid only. Accordingly the wetting agent is preferably employed in an amount of from about 2.0 weight percent to about 10 weight percent.

In preparing the stripping solution, water can be present in an amount up to about 40 weight percent of the stripping solution. Should more than about 40% of water be present in the stripping solution, the stripping efficiency can be impaired. Of course water can be purposely added, so long as the amount does not exceed about 40 weight percent and preferably does not exceed about 30 weight percent in the stripping solution. Water present in an amount up to about 30 weight percent can, in fact, beneficially affect handling characteristics of the stripping solution. Should water be added, any natural water supply is suitable whereby both soft and hard water can be utilized. Accordingly, other ions cause no adverse effects in amounts commonly known to be present in natural water, for example fluoride, chloride, phosphate, sulfate, and metals such as calcium, magnesium, iron, aluminum, and the like.

Preferably the stripping solution consists essentially of sulfuric acid, an anionic surfactant and water. The simple admixture of sulfuric acid, anionic wetting agent, and water in the amounts disclosed above and in accordance with normal chemical practice will suffice to prepare the solution. The ingredients should be added together slowly so that exothermic heat generated when the ingredients are mixed does not become excessive. Excessive heat, that is above about 82° C, can decompose, gel, factionate or otherwise adversely affect the wetting agent.

When employing the stripping solution to remove paint from a rubber surface, intimate contact is maintained between the stripping solution and the painted surface. Any method by which intimate contact can be maintained for a period from about 10 minutes to about 40 minutes is suitable. For example, immersing and spraying applications can be employed. It is preferred to contact the painted rubber surface with the stripping solution by immersion, as it is the simplest and safest method of obtaining intimate contact between the stripping solution and a surface. Rubber articles which can take the form of complex shapes are most easily contacted at all parts of the surface by immersion of the article. It is unnecessary to employ high temperatures in the process of the invention, as temperatures as low as about 40° C can be suitably employed. We prefer, however to employ temperatures above about 50° C as the time required for removing the paint from the rubber surface is shortened thereby. At temperatures above about 82° C, the wetting agent can be adversely affected. Accordingly, at temperatures above about 82° C, the usefulness of the stripping solution can be impaired. When temperatures above about 70° C are employed, the time required for paint removal can be beneficially shortened, but energy required to heat the solution and an increased hazard to handling render such elevated temperatures less desirable. Accordingly, it is preferred to use temperatures from about 50° C to about 70° C. In this range, a balance between heating requirements and the time required for paint removal, is obtained.

In the process of employing the stripping solution, dilution in excess of about 40 weight percent of water in the stripping solution should be avoided. Dilution can occur, for example in a humid atmosphere wherein moisture is taken up by the stripping solution over a period of time. For this reason, it can be desirable to cover the solution, particularly during long periods of storage.

Subsequent to contacting the painted rubber surface with the stripping solution, the surface is rinsed with water and dried. If desired, an alkaline rinse can be employed to neutralize any acid remaining on the surface, though it has been found a simple water spray is sufficient. Subsequently the dried rubber surface can be repainted.

By way of further demonstrating the usefulness of the stripping solution in the process of the invention, the following examples are presented.

EXAMPLE I

An EPDM (ethylene propylene diene monomer) synthetic rubber article having two coats of a polyurethane paint, heat-cured after each of the coats, was immersed in a solution whose constituents are, 72 weight percent of concentrated sulphuric acid (95%), 8 weight percent of Alkawet-B (50% active ingredient, stated to be a sodium salt of an alkoxy acid) and 20 weight percent of water, at a temperature of 49° C. After 15 minutes in the solution, the rubber article was removed and rinsed with a water jet. The rubber surface was found to be completely free of paint.

EXAMPLE II

An EPDM synthetic rubber article having a two coat paint system was immersed in a solution for stripping the paint from the rubber surface of the article. The prime coat of the two coat system was a polyether paint and the top coat was a polyurethane paint. Both coats had been applied and heat-cured in a manner commonly employed in painting rubber articles.

The painted rubber surface was contacted with a solution consisting of 80 weight percent of concentrated (95%) sulphuric acid, 5 weight percent of Ultrawet 40SX (41.5% active ingredient, stated to be sodium Xylene sulfonate), 5 weight percent of Alkawet-B (50% active ingredient), and 10 weight percent of water at a temperature of 49° C. After 15 minutes in the solution the article was removed, and water rinsed. The rubber surface was observed to be completely free of paint.

EXAMPLE III

An EPDM synthetic rubber article having two coats of a polyurethane paint, heat-cured after each of the coats, was immersed in a solution consisting of 64 weight percent of concentrated sulfuric acid (95%), 15 weight percent of Klearfac AA040 (60% active ingredient, stated to be an organic phosphate ester) and 21 weight percent of water at a temperature of 49° C. Following immersion of the rubber article for a period of 20 minutes, the article was removed from the solution and rinsed with a water jet, and thereafter dried. The article was then compared to an identical article, immersed as above, but for comparison, in 70 weight percent of concentrated sulfuric acid (95 %) without wetting agents.

The article which had been immersed in the solution having the anionic wetting agent (Klearfac AA040) removed the paint more quickly than the article immersed in concentrated sulfuric acid only.

EXAMPLE IV

To demonstrate the high adherence of paint to a rubber surface, a polyurethane paint was reapplied to an EPDM rubber article stripped of its original polyurethane coating as follows: The EPDM synthetic rubber article having two coats of a polyurethane paint, heat-cured after each of the coats, was immersed in a solution consisting of 72 weight percent of concentrated sulfuric acid (95%), 8 weight percent of Alkawet-B (50% active ingredient of sodium alkoxy sulfonate) and 20 weight percent of water. After 15 minutes in the solution the article was removed, water rinsed and dried.

Without any additional treatment, the rubber article was given a polyurethane prime coat of at least 0.8 mil (2 microns) thickness and oven-dried at 115° C. A second polyurethane paint coat was thereafter applied to a thickness of 1.8 mil (4.6 microns). Subsequent to the second paint coat, the rubber article was oven-dried at 125° C. The repainted rubber article was then tested for paint adherence.

The repainted rubber article was immersed for 10 days in deionized water at 32° C. The water was agitated and deaerated. After 10 days immersed in the deionized water, the article was removed from the water and the surface of the article was scribed with an X in such a way as to penetrate the paint and expose the rubber. The scribe marks were covered with adhesive plastic tape, which was then removed, pulling with it any nonadherent paint. The article was then observed and compared to an originally painted identical article. The article which had been stripped of paint by the solution and subsequently repainted was observed to be equal in quality to that of the originally painted identical article.

What is claimed is:

1. A process for removing organic resinous material from a rubber surface comprising contacting an organic resin coated rubber surface with a homogeneous liquid stripping solution comprising sulfuric acid wherein said sulfuric acid concentration is from about 55 weight percent to about 99.99 weight percent, and anionic wetting agent, wherein said anionic wetting agent is preselected so as to remain in a stable fluid state in combination with said sulfuric acid and wherein said anionic wetting agent is present in the solution in an amount from about 0.025 weight percent to the limit of its solubility and wherein in the solution, water is present in an amount not to exceed about 40 weight percent said contact being at a temperature of from about 40° C to about 82° C for a time sufficient to remove said resin from said surface.

2. The process of claim 1 wherein the anionic wetting agent is selected from the group consisting of an alkoxy acid, sulfonate salts and phosphate esters of aryl and lower aralkyl compounds, and their acid soluble metal and ammonium salts.

3. The process of claim 1 wherein the acidic stripping solution is contacted with the painted rubber surface at a temperature of from about 50° C to about 70° C for a period of time of from about 10 minutes to about 40 minutes.

4. A process according to claim 1 wherein the rubber surface is a synthetic rubber.

5. The process of claim 1 wherein the rubber surface is comprised of polyolefin synthetic rubber.

6. A process according to claim 1 wherein the organic resinous material is selected from the group consisting of polyacrylic, polyurethane, and polyester.

7. A process according to claim 1 wherein the organic resinous material is a latex.

8. A process for removing paint from a rubber surface comprising contacting a painted rubber surface with an acidic stripping solution consisting essentially of sulfuric acid, an anionic wetting agent, and water, wherein the sulfuric acid is present in an amount from about 70 weight percent to about 95 weight percent, the anionic wetting agent is present in an amount from about 2 weight percent to about 10 weight percent, and the water is present in an amount to about 30 weight percent.

9. The process of claim 8 wherein the anionic wetting agent is a wetting agent selected from the group consisting of an alkoxy acid, phosphate esters of aryl and lower aralkyl compounds, and their sodium salts.

* * * * *